(12) United States Patent
Roh et al.

(10) Patent No.: US 7,945,835 B2
(45) Date of Patent: May 17, 2011

(54) METHOD AND APPARATUS FOR EFFICIENTLY RETRANSMITTING DATA IN WIRELESS NETWORK ENVIRONMENT

(75) Inventors: Dong-hwi Roh, Seoul (KR); Chang-yeul Kwon, Yongin-si (KR); Guoping Fan, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1218 days.

(21) Appl. No.: 11/599,483

(22) Filed: Nov. 15, 2006

(65) Prior Publication Data

US 2007/0113140 A1      May 17, 2007

Related U.S. Application Data

(60) Provisional application No. 60/736,326, filed on Nov. 15, 2005.

(30) Foreign Application Priority Data

Feb. 27, 2006  (KR) ......................... 10-2006-0018882

(51) Int. Cl.
*H04L 1/16*     (2006.01)
(52) U.S. Cl. ....................................................... 714/748
(58) Field of Classification Search .................. 714/748, 714/749
See application file for complete search history.

(56) References Cited

U.S. PATENT DOCUMENTS

| | | | |
|---|---|---|---|
| 5,946,320 A | 8/1999 | Decker | |
| 6,496,481 B1 * | 12/2002 | Wu et al. ....................... | 370/242 |
| 6,574,668 B1 * | 6/2003 | Gubbi et al. ................... | 709/237 |
| 7,385,976 B2 * | 6/2008 | Gu et al. ....................... | 370/389 |
| 7,474,676 B2 * | 1/2009 | Tao et al. ....................... | 370/469 |
| 7,487,424 B2 * | 2/2009 | Nam et al. .................... | 714/748 |
| 7,496,076 B2 * | 2/2009 | Takagi et al. ................. | 370/338 |
| 7,502,330 B2 * | 3/2009 | Nabetani et al. .............. | 370/252 |
| 7,535,858 B2 * | 5/2009 | Trainin et al. ................ | 370/278 |
| 7,577,145 B2 * | 8/2009 | Maruyama et al. ........... | 370/392 |
| 7,586,948 B2 * | 9/2009 | Hiddink et al. ............... | 370/473 |
| 7,599,363 B2 * | 10/2009 | Jang et al. ..................... | 370/389 |
| 2004/0153909 A1 | 8/2004 | Lim et al. | |
| 2004/0177306 A1 | 9/2004 | Hiraki | |

\* cited by examiner

*Primary Examiner* — Stephen M Baker
(74) *Attorney, Agent, or Firm* — Sughrue Mion, PLLC (57) ABSTRACT

A method and apparatus for efficiently retransmitting data in a wireless network environment are provided. The method includes transmitting a block comprising one or more data frames to a terminal, receiving an acknowledgement of receipt of the block from the terminal, and retransmitting a block comprising data frames that have not yet been received by the terminal to the terminal by referencing the acknowledgement of receipt. Accordingly, it is possible to enhance overall throughput by reducing receipt acknowledgement time during a data retransmission operation.

14 Claims, 6 Drawing Sheets

FIG. 8 ered by the receiving device 2000. The transmitting device
METHOD AND APPARATUS FOR EFFICIENTLY RETRANSMITTING DATA IN WIRELESS NETWORK ENVIRONMENT

CROSS-REFERENCE TO RELATED PATENT APPLICATION

This application claims priority from Korean Patent Application No. 10-2006-0018882, filed on Feb. 27, 2006, in the Korean Intellectual Property Office, and U.S. Provisional Application No. 60/736,326 filed Nov. 15, 2005 in the U.S. Patent and Trademark Office, the disclosures of which are incorporated herein by reference in their entirety.

BACKGROUND OF THE INVENTION

1. Field of the Invention

Methods and apparatuses consistent with the present invention relate to efficiently retransmitting data in a wireless network environment.

2. Description of the Related Art

With the advent of the ubiquitous computing and recent developments in network technology, research has been conducted regarding wireless network techniques that are region independent and convenient. Wireless networks are advantageous in terms of transmitting data without using lines. However, in wireless networks, a plurality of devices must share limited wireless resources to transmit considerable amounts of multimedia data. Thus, the more severe the contention for wireless data resources becomes, the more likely that wireless data resource loss wireless data loss will occur. In this regard, wireless networks are less efficient than wired networks. In order to safely transmit data and reduce data loss and collisions between data transmissions conducted in a wireless network environment, a distributed coordination function (DCF) and a point coordination function (PCF) have been widely used. In particular, in a wireless personal area network (PAN) environment, a channel time allocation method can be used.

The aforementioned problem with wireless networks can be addressed by using a DCF, a PCF, or a channel time allocation method. However, there still remains other problems associated with the inherent characteristics of wireless networks such as multi-paths, fading, and interference, and these are obstacles to the smooth transmission of data. As the number of wireless networks increases, data loss and collisions between data transmissions are more likely to occur, and the frequency of data retransmissions that adversely affect the speed of transmission of data in a wireless network is more likely to increase. This is especially the case for such data as audio/video (A/V) data that needs to be precisely transmitted and thus requires a high quality of service (QoS). Thus, improved data retransmission methods capable of securing as wide an available bandwidth as possible by reducing the number of data retransmissions are needed.

Figure 1:
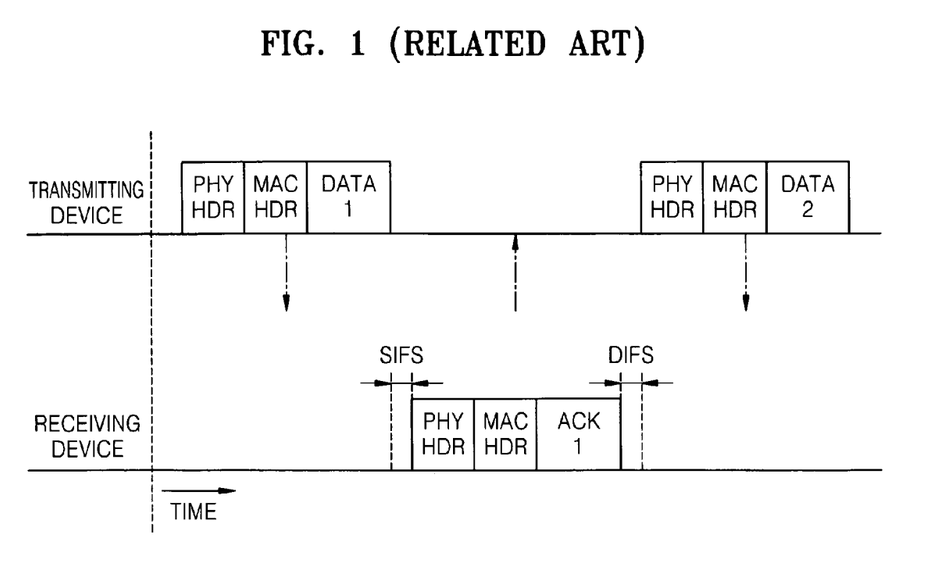
FIG. 1 is a diagram for explaining a related art method of transmitting data between wireless devices.

FIG. 1 is a diagram for explaining a related art method of transmitting data between related art wireless devices. Referring to FIG. 1, in a wireless network environment, a transmitting device generates a plurality of headers for a media access control (MAC) layer (MAC HDR) and a physical (PHY) layer (PHY HDR), i.e., a MAC header and a PHY header respectively, and transmits information consisting of the PHY header, the MAC header, and data 1 to a receiving device according to the IEEE 802.11 standard. Then, the receiving device precisely receives the first data frame a short inter frame space (SIFS) after the transmission of the first data frame by the transmitting device according to the IEEE 802.11 standard. If no error is detected from the first data frame, the receiving device transmits the first data frame to an upper layer, and transmits an acknowledgement (ACK) frame consisting of a PHY header, an MAC header, and ACK 1 to the transmitting device in order to notify the transmitting device that the first data frame has been successfully received by the receiving device 2000. The transmitting device receives the ACK frame transmitted by the receiving device, and transmits a second data frame consisting of a PHY header, an MAC header, and data 2 to the receiving device a DCF inter frame space (DIFS) after the reception of the ACK frame, according to the IEEE 802.11 standard.

Figure 2:
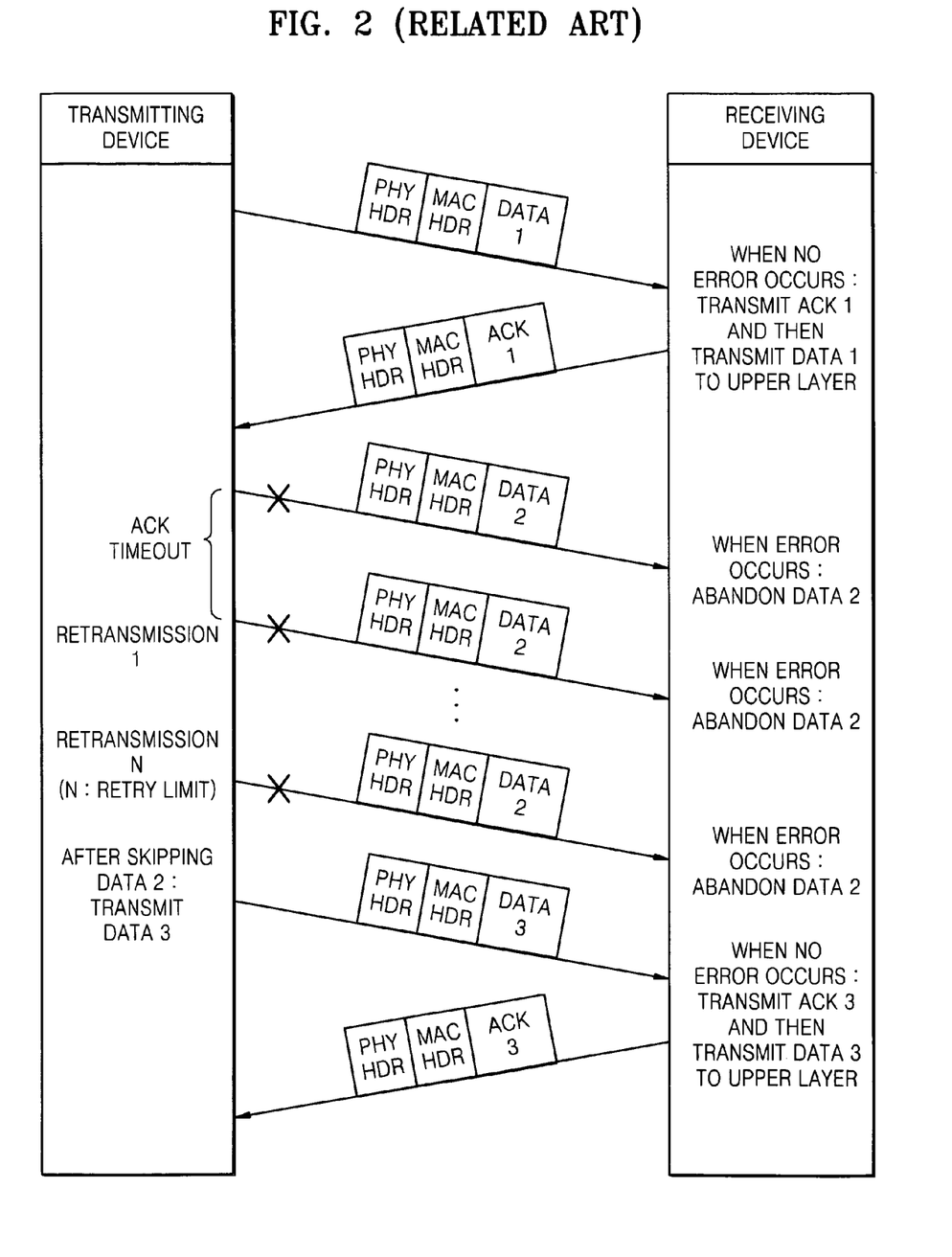
FIG. 2 is a diagram for explaining a related art method of handling a failure or error in the transmission of data between wireless devices.

FIG. 2 is a diagram for explaining a related art method of handling a failure or error in the transmission of data between wireless devices. Referring to FIG. 2, a transmitting device transmits data 1 to a receiving device. If data 1 is smoothly transmitted to the receiving device, the receiving device transmits ACK 1 to the transmitting device, and transmits data 1 to an upper layer. The transmitting device receives ACK 1, and then transmits data 2 to the receiving device. As soon as the transmitting device transmits data 2 to the receiving device, a counter begins to operate. If the counter stops operating and an acknowledgement is not received from the receiving device within an acknowledgement timeout period (ACK Timeout) after the transmission of data 1, the transmitting device determines that the transmission of data 2 has failed, and retransmits data 2 to the receiving device. In this case, the receiving device abandons data 2 instead of transmitting it to an upper layer. The transmitting device can retransmit data 2 to the receiving device a number of times, corresponding to a retry limit value. If the transmitting device receives no acknowledgement from the receiving device even though the transmitting device has retransmitted data 2 to the receiving device as many times as indicated by the retry limit value, the transmitting device skips data 2, and transmits data 3 to the receiving device. If data is received by the receiving device and an error is not detected from data 3, the receiving device transmits data 3 to the upper layer, and transmits ACK 3 to the transmitting device.

In the related art, a transmitting device must transmit data to a receiving device in units of frames and receive an ACK frame from the receiving device for each frame transmitted by the transmitting device, thereby wasting time sequentially transmitting a plurality of frames. Also, the transmission of data between the transmitting device and the receiving device may not be smooth, as in the case of transmission of data 2 illustrated in FIG. 2. In addition, an MAC header and a PHY header are attached to each frame, thereby limiting the amount of data that can be transmitted at a time and reducing the efficiency of data transmission. Moreover, the transmission of short frames such as A/V stream data frames may result in relatively high overheads.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a method and apparatus for efficiently retransmitting data in a wireless network environment, which can enhance overall throughput and guarantee safe transmission of data by efficiently performing data retransmission if the transmission of data from a transmitting device to a receiving device is not smooth.

The present invention also provides a computer-readable recording medium storing a computer program for executing the method of efficiently retransmitting data in a wired network environment.

According to an aspect of the present invention, there is provided a method of transmitting data including transmitting a block comprising one or more data frames to a terminal, receiving an acknowledgement of receipt of the block from the terminal, and retransmitting a block comprising data frames that have not yet been received by the terminal to the terminal by referencing the acknowledgement of receipt.

According to another aspect of the present invention, there is provided a computer-readable recording medium storing a computer program for executing the method of transmitting data.

According to another aspect of the present invention, there is provided a method of receiving data including receiving a block comprising one or more data frames from a terminal, transmitting an acknowledgement of receipt indicating which of the data frames included in the received block have not yet been received to the terminal, and re-receiving a block of the data frames that have not yet been received from the terminal.

According to another aspect of the present invention, there is provided a computer-readable recording medium storing a computer program for executing the method of receiving data.

According to another aspect of the present invention, there is provided a block transmission apparatus. The block transmission apparatus includes a transmission unit which transmits a block comprising one or more data frames to a terminal, and a reception unit which receives an acknowledgement of receipt of the block from the terminal, wherein the transmission unit retransmits a block comprising data frames that have not yet been received by the terminal to the terminal by referencing the acknowledgement of receipt.

According to another aspect of the present invention, there is provided a block reception apparatus. The block reception apparatus includes a reception unit which receives a block comprising one or more data frames from a terminal, and a transmission unit which transmits an acknowledgement of receipt indicating which of the data frames included in the received block have not yet been received to the terminal, wherein the transmission unit re-receives a block of the data frames that have not yet been received from the terminal.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF THE EXEMPLARY EMBODIMENTS OF THE INVENTION

The present invention will now be described more fully with reference to the accompanying drawings in which exemplary embodiments of the invention are shown.

Figure 3:
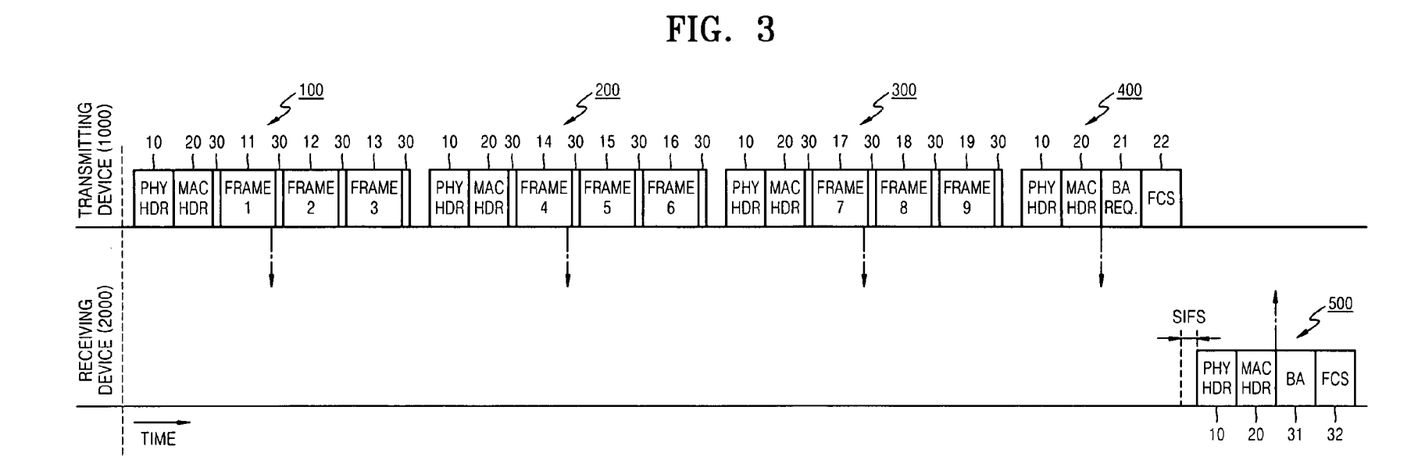
FIG. 3 is a diagram illustrating the formats of a plurality of blocks according to an exemplary embodiment of the present invention.

FIG. 3 is a diagram illustrating the formats of a plurality of blocks 100, 200, and 300 according to an exemplary embodiment of the present invention. Referring to FIG. 3, the block 100 includes a plurality of data frames 11 through 13, the block 200 includes a plurality of data frames 14 through 16, and the block 300 includes a plurality of data frames 17 through 19. A transmitting device 1000 sequentially transmits the blocks 100, 200, and 300 to a receiving device 2000, and transmits a block acknowledgement request (BA Req.) 400 to the receiving device 2000 in order to notify the receiving device 2000 that the data needed to be transmitted has all been transmitted to the receiving device 2000 and to request the receiving device 2000 for an acknowledgement of receipt of the blocks 100, 200, and 300. Then, the receiving device 2000 responds to the block ACK request 400 by transmitting a block ACK frame 500 having bitmap information.

In detail, the block 100 includes a PHY header 10, an MAC header 20, the data frames 11 through 13, and a plurality of delimiters 30. The PHY header 10 complies with the IEEE 802.11 standard, but the present invention is not restricted to this. The MAC header 20 may also have the same structure as an IEEE 802.11 header. The MAC header 20 may include a frame control field, a duration/identifier (ID) field, at least one address field (e.g., addresses 1 through 4), and a sequence control field. The definition and format of each of the fields of the MAC header 20 are prescribed in the IEEE 802.11 standard. The data frame 11 comprises one or more data units. In other words, the data frame 11 may be comprised of a single data unit or may be comprised of a plurality of data units. If the data frame 11 is comprised of a plurality of data units, the data frame 11 is deemed erroneous even if an error is detected from only one of the data units. One or more data units constituting the data frame 11 may have the same format as MPEG-2 transport streams, but the present invention is not restricted to this. The delimiters 30 are placed among the data frames 11, 12, and 13. Each of the delimiters 30 is functional information that identifies each of the data frames 11, 12, and 13 and may include serial number information that differentiates the data frames 11, 12, and 13 from one another, checksum information needed to detect errors, and information (e.g., a time stamp) needed to synchronize the data frames 11, 12, and 13.

The block ACK request 400 includes a PHY header 10, a MAC header 20, a block ACK request control field, a block ACK starting sequence control field, and a frame check sequence (FCS) 22. The block ACK request 400 is used to issue a request to the receiving device 2000 for an acknowledgement of receipt. The transmitting device 1000 transmits the block ACK request 400 to the receiving device 2000 if there is no data left to be transmitted to the receiving device 2000, thereby notifying the receiving device 2000 that the data needed to be transmitted has all been transmitted to the receiving device 2000. Then, the receiving device 2000 responds to the block ACK request 400 by transmitting an acknowledgement of receipt to the transmitting device 1000. Information regarding a request for an acknowledgement of receipt is present in a frame type field of the MAC header 20 of the block ACK request 400, and this information complies with the IEEE 802.11e standard.

According to the present exemplary embodiment, since all the data frames 11, 12, and 13 need an acknowledgement of receipt, the block ACK frame 500 is used by the receiving device 2000 to acknowledge receipt of each of the data frames included in each of the blocks 100, 200, and 300 that are sequentially transmitted by the transmitting device 1000.

The block ACK frame 500 contains a bitmap that indicates whether each of the data frames 11, 12, and 13 is erroneous. The transmitting device 1000 determines which of the data frames 11, 12, and 13 needs to be retransmitted by referencing the bitmap contained in the block ACK frame 500. The block ACK frame 500 includes a PHY header 10, a MAC header 20, and a bitmap field 31.

Figure 4:
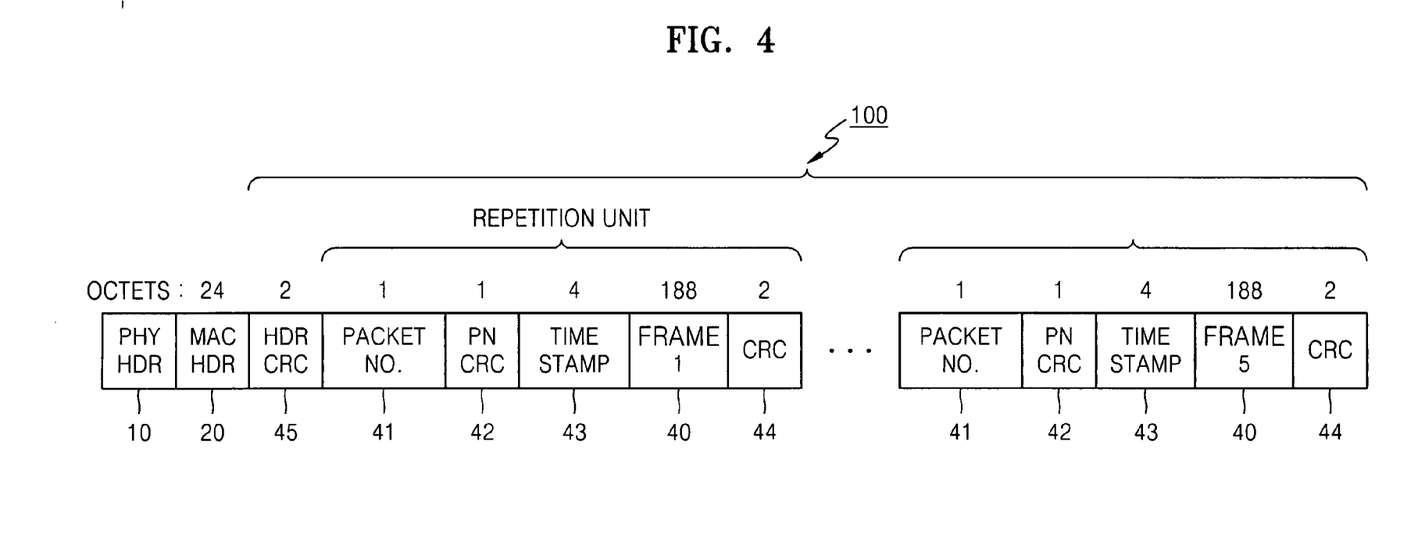
FIG. 4 is a diagram illustrating the format of one of the blocks illustrated in FIG. 3.

FIG. 4 is a diagram illustrating the format of the block 100 illustrated in FIG. 3. Referring to FIG. 4, a block frame 40 is combined with a packet number field 41, a pseudo number (PN) cyclic redundancy check (CRC) field 42, a time stamp field 43, and a CRC field 44, and a combination of the block frame 40, the packet number field 41, the PN CRC field 42, the time stamp field 43, and the CRC field 44 forms a repetition unit.

Figure 7:
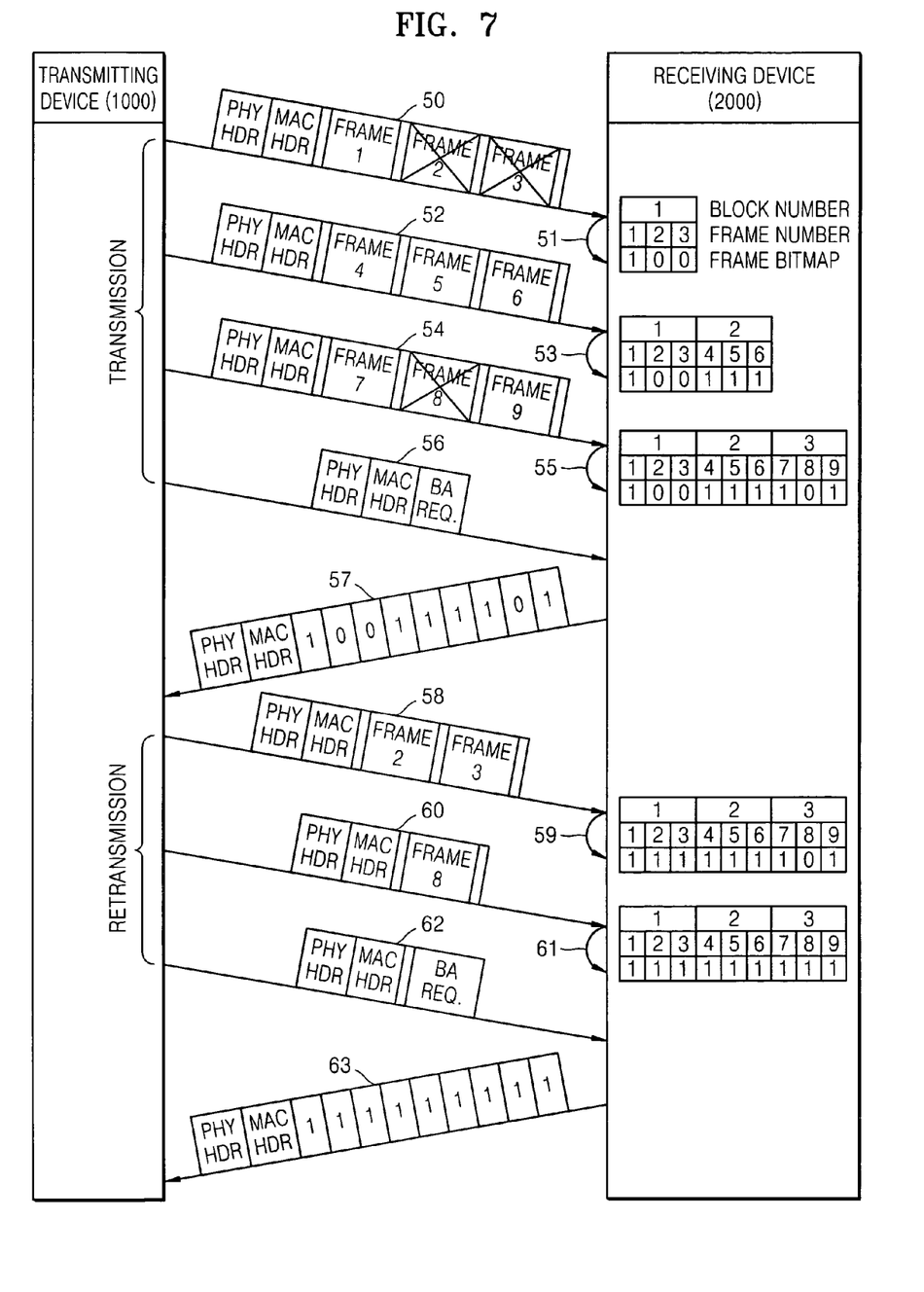
FIG. 7 is a diagram for explaining a method of retransmitting data according to an exemplary embodiment of the present invention.

A sequence number of a data frame that is contained in a block body is recorded in the packet number field 41. Referring to FIG. 7, sequence numbers (e.g., 1-5 or 0-4) of a total of five frames ranging from frame 1 to frame 5 are sequentially recorded in the packet number field 41. In this case, frames 1 through 5 are sequentially transmitted according to their sequence numbers.

A checksum for determining whether the packet number field 41 is erroneous is recorded in the PN CRC field 42. A CRC method can be used to obtain the checksum recorded in the PN CRC field 42, but the present invention is not restricted to this. An error in the packet number field 41 can be interpreted as an error in the transmission of the corresponding data frame.

Time information indicating if a data unit departing from an upper layer arrives at an MAC layer is recorded in the time stamp field 43 as a tag value. The time stamp field 43 is used for transmitting isochronous data such as a Transport Stream (TS). The time stamp field 43 may also be used for transmitting asynchronous data.

A checksum for determining whether the block frame 40 is erroneous is recorded in the time stamp field 43. A CRC method can be used to obtain the checksum stored in the CRC field 44. Alternatively, a checksum for determining whether the time stamp field 43 and the frame data 40 are erroneous may be recorded in the CRC field 44. A header CRC field 45 that stores a checksum for determining whether the MAC header 20 is erroneous can also be included in the frame body. It is determined whether to transmit the frame data by referencing the CRC field 44.

Figure 5:
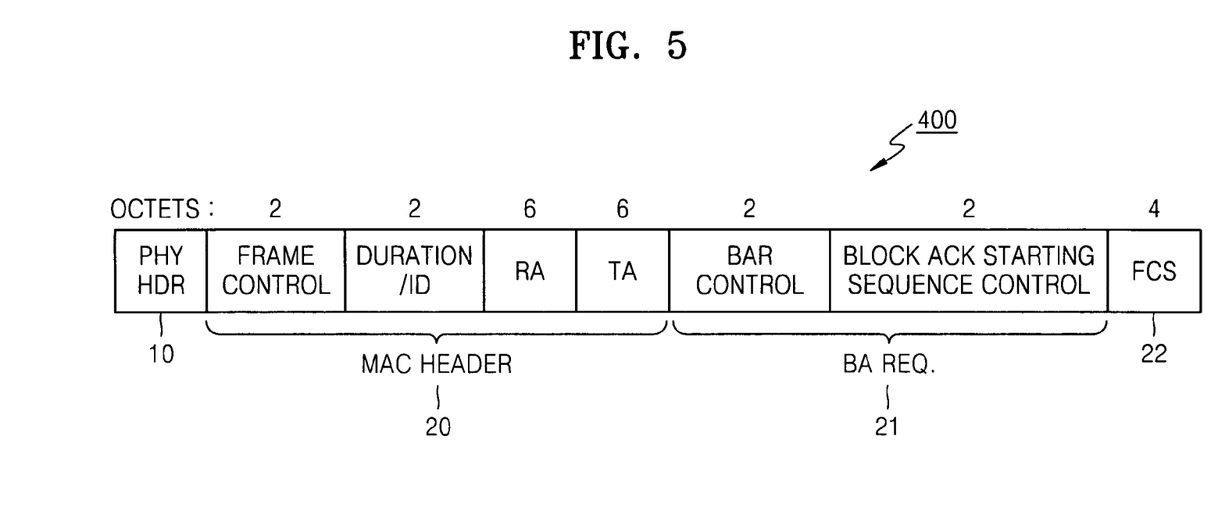
FIG. 5 is a diagram illustrating the format of a block ACK request illustrated in FIG. 3.

FIG. 5 is a diagram illustrating the format of the block ACK request 400 illustrated in FIG. 3. Referring to FIG. 5, the block ACK request 400 includes a PHY header 10, an MAC header 20, a block ACK request field 21, and a FCS field 22. According to the IEEE 802.11 standard, the MAC header 20 of the block ACK request 400 includes a frame control field, a duration/ID field, a receiver address field that contains the address of the receiving device 2000, and a transmitter address field that contains the address of the transmitting device 1000.

The block ACK request field 21 includes a block ACK request control field, and a block ACK starting sequence control field. The block ACK request control field indicates that the block ACK request 400 is associated with a block ACK. The block ACK starting sequence control field stores the serial numbers of a plurality of data frames in increasing order.

Figure 6:
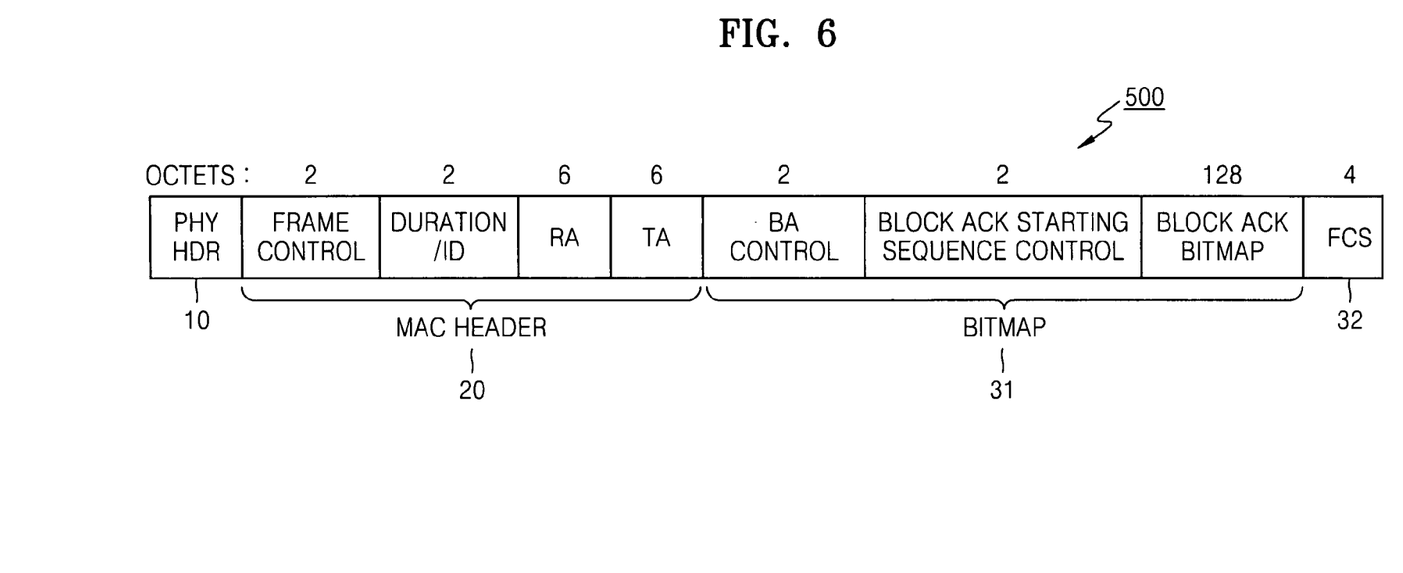
FIG. 6 is a diagram illustrating the format of the block ACK frame illustrated in FIG. 3.

FIG. 6 is a diagram illustrating the format of the block ACK frame 500 illustrated in FIG. 3. Referring to FIG. 6, the block ACK frame 500 includes a PHY header 10, an MAC header 20, a bitmap field 31, and an FCS field 32. According to the IEEE 802.11 standard, the MAC header 20 of the block ACK frame 500 includes a frame control field, a duration/ID field, a receiver address field that contains the address of the receiving device 2000, and a transmitter address field that contains the address of the transmitting device 1000.

The bitmap field 31 includes a block ACK control field, a block ACK starting sequence control field, and a block ACK bitmap. The block ACK control field indicates that the block ACK frame 500 is associated with a block ACK, and the block ACK starting sequence control field stores the serial numbers of a plurality of data frames in increasing order. A plurality of bits of the block ACK bitmap respectively correspond to the data frame serial numbers that are recorded in the packet number field 50. Accordingly, the block ACK bitmap can be created according to the order of reception of the data frames. The bits of the block ACK bitmap indicate that the respective data frames have been properly received by the receiving device 2000. For example, if a bit of the block ACK bitmap has a value of 1, it is determined that a data frame corresponding to the bit of the block ACK bitmap has been properly received by the receiving device 2000. On the other hand, if a bit of the block ACK bitmap has a value of 0, it is determined that a data frame corresponding to the bit of the block ACK bitmap has not been properly received by the receiving device 2000.

FIG. 7 is a diagram for explaining a method of efficiently retransmitting data in a wireless network environment according to an exemplary embodiment of the present invention. Specifically, FIG. 7 illustrates how a transmitting device and a receiving device handle a failure or error in the transmission between the transmitting device and the receiving device. Referring to FIG. 7, in operation 50, the transmitting device 1000 transmits a first block that is generated by combining a first data frame, a second data frame, and a third data frame to the receiving device 2000.

In operation 51, if errors are detected from the second and third data frames, the receiving device 2000 determines that the entire first block is erroneous, stores the first block in a buffer without transmitting the first data frame to an upper layer, and creates a bitmap that comprises a block number field and three frame number fields. In this case, the first data frame is stored in a block number one field and a frame number one field, the second data frame is stored in the block number one field and a frame number two field, and the third data frame is stored in the block number one field and a frame number three field. Also, in this case, the first data frame can be set to a value of 1, and the second and third frames that are erroneous can be set to a value of 0.

In operation 52, the transmitting device 100 transmits a second block that is generated by combining a fourth data frame, a fifth data frame, and a sixth data frame to the receiving device 2000.

In operation 53, if all of the fourth through sixth data frames included in the second block are received without any errors, the receiving device 200 stores the fourth through sixth data frames in a block number two field and in respective corresponding frame number fields, thereby creating a bitmap. In this case, assuming that a data frame that has been properly received by the receiving device 2000 is set to a value of 1 as in the case of the first through third data frames, the fourth through sixth data frames are all set to a value of 1.

In operation 54, the transmitting device 1000 transmits a third block that is generated by combining a seventh data frame, an eighth data frame, and a ninth data frame to the receiving device 2000.

In operation 55, if the receiving device 2000 only receives the seventh and ninth data frames, the receiving device 2000 stores the seventh, eighth, and ninth data frames in a block number three field and in respective corresponding frame number fields, as in the case of the first through sixth data frames. Here, the seventh and ninth data frames are both stored as a value of 1, and the eighth data frame is stored as a value of 0.

In operation 56, the transmitting device 1000 notifies the receiving device 2000 that all the data frames needed to be transmitted have been transmitted, and transmits a block ACK request to the receiving device 2000.

In operation 57, the receiving device 2000 transmits the bitmap completed in operations 51, 53, and 55 to the transmitting device 1000.

In operation 58, the transmitting device 1000 retransmits the data frames stored in the bitmap that were transmitted by the receiving device 2000 as a value of 0 in the form of a block. Since the second, third, and eighth data frames are erroneous, the transmitting device 1000 transmits a block that is generated by combining the second, third, and eighth data frames to the receiving device 2000.

In operation 59, the receiving device 2000 creates a bitmap using the same method used for creating a bitmap if receiving first data transmitted by the transmitting device 1000. In other words, if the second and third data frames are received without any errors, the receiving device 2000 replaces the second and third data frame values (i.e., a value of 0) stored in the bitmap obtained in operation 55 with a value of 1.

In operation 60, the transmitting device 1000 transmits a block that comprises the eighth data frame to the receiving device 2000.

In operation 61, the receiving device 2000 replaces the eighth data frame value (i.e., a value of 0) stored in the bitmap obtained in operation 59 with a value of 1 using the same method used for creating a bitmap for the first data transmitted by the transmitting device 1000.

In operation 62, the transmitting device 1000 notifies the receiving device 2000 that all the data frames needed to be transmitted have been transmitted, and transmits a block ACK request to the receiving device 2000.

In operation 63, since the first through ninth data frames have all been received by the receiving device 2000 without any errors in the retransmissions performed in operations 58 and 60, the receiving device 2000 transmits the bitmap obtained in operation 61 to the transmitting device 1000. In the bitmap obtained in operation 61, the first through ninth data frames are all marked by a value of 1. Once the transmitting device 1000 recognizes that the first through ninth data frames have all been successfully received by the receiving device 2000, the transmitting device 1000 does not perform any more retransmission operations. In other words, once the transmitting device 1000 receives an acknowledgement of receipt of the first through ninth data frames from the receiving device 2000, the transmitting device 1000 does not perform any more retransmission operations.

Referring to FIG. 7, three data frames form a block, and thus, a total of nine data frames form three blocks. The transmitting device 1000 can sequentially transmit the three blocks to the receiving device 2000 at regular time intervals (in operations 50, 52, and 54). The transmission interval may be an SIFS which is the shortest duration defined in the IEEE 802.11 standard. Since an SIFS is short, it is possible to obtain almost the same effect of transmitting a plurality of blocks at the same time by transmitting the blocks at SIFS intervals.

Figure 8:
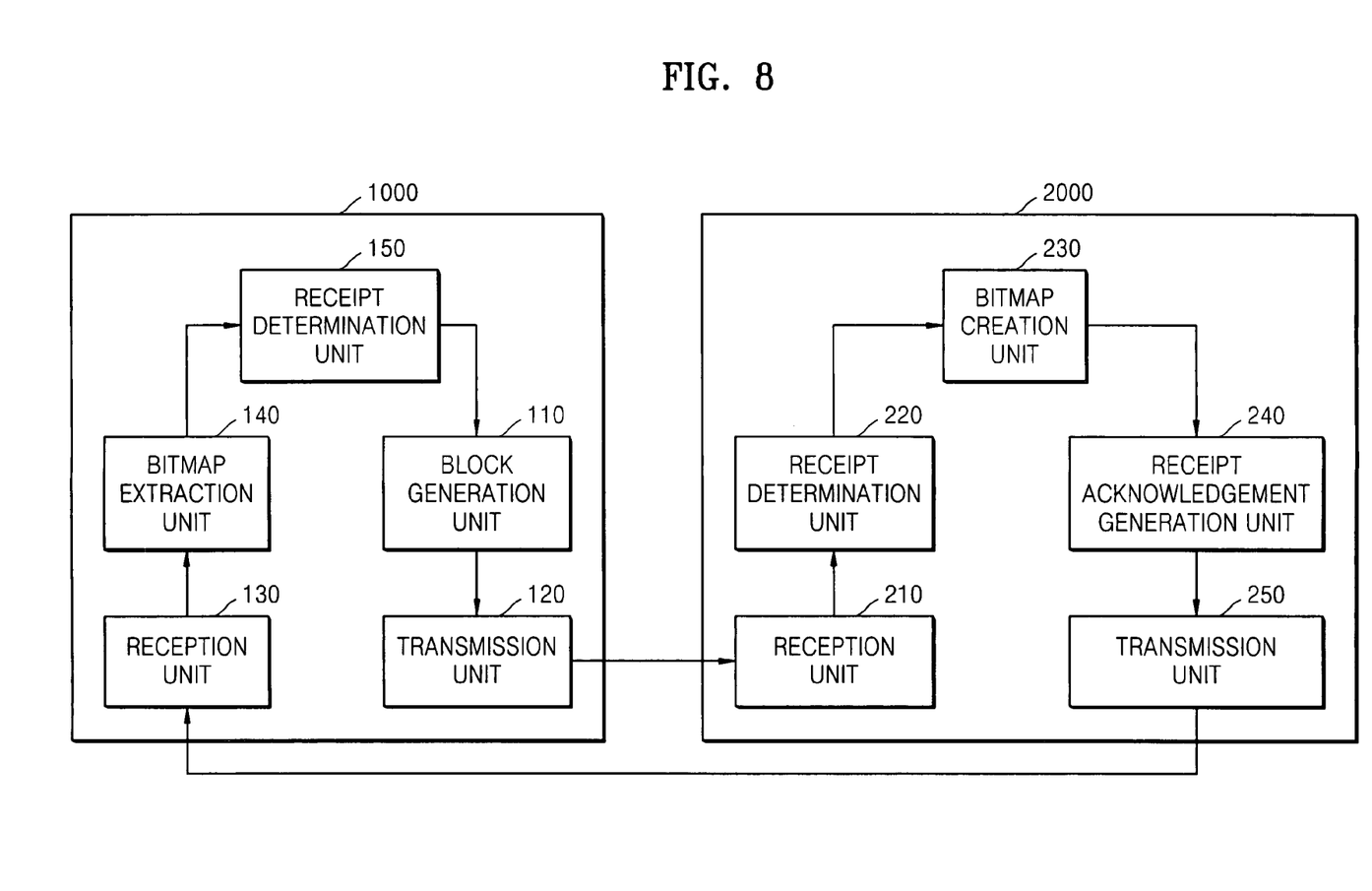
FIG. 8 is a block diagram of a data transmission/reception system according to an exemplary embodiment of the present invention.

FIG. 8 is a block diagram of a data transmission/reception system according to an exemplary embodiment of the present invention. Referring to FIG. 8, a transmitting device 1000 includes a block generation unit 110, a transmission unit 120, a reception unit 130, a bitmap extraction unit 140, and a receipt determination unit 150.

The block generation unit 110 generates a block comprising at least one data frame, and transmits the block to the transmission unit 120. Also, the block generation unit 110 generates a block comprising one or more data frames that have not been received by a receiving device 2000 by referencing a bitmap transmitted by the receipt determination unit 150, and transmits the block to the transmission unit 120.

The transmission unit 120 receives a block generated by the block generation unit 110 and transmits the received block to the receiving device 2000.

The reception unit 130 receives an ACK frame from the receiving device 2000, and transmits the acknowledgement of receipt to the bitmap extraction unit 140.

The bitmap extraction unit 140 extracts a bitmap from the acknowledgement of receipt transmitted by the reception unit 130. The bitmap indicates whether each data frame transmitted by the transmission unit 120 has been successfully received by the receiving device 2000. Thereafter, the bitmap extraction unit 140 transmits the bitmap to the receipt determination unit 150.

The receipt determination unit 150 receives the bitmap transmitted by the bitmap extraction unit 140, determines whether each data frame transmitted by the transmission unit 120 has been successfully received by the receiving device 2000, and transmits the results of the determination to the block generation unit 110.

Referring to FIG. 8, the receiving device 2000 includes a reception unit 210, a receipt determination unit 220, a bitmap creation unit 230, a receipt acknowledgement generation unit 240, and a transmission unit 250.

The reception unit 210 receives a block comprising at least one data frame from the transmitting device 1000, and transmits the block to the receipt determination unit 220.

The receipt determination unit 220 determines whether each data frame transmitted by the transmitting device 1000 has been received by the reception unit 210 without any errors, and transmits the results of the determination to the bitmap creation unit 230.

The bitmap creation unit 230 creates a bitmap according to the results of the determination performed by the receipt determination unit 220, and transmits the bitmap to the receipt acknowledgement generation unit 240.

The receipt acknowledgement generation unit 240 generates an acknowledgement of receipt in which data frames received by the receiving device 2000 are differentiated from data frames yet to be received by the receiving device 2000 in the form of a block, and transmits the acknowledgement of receipt to the transmission unit 250.

The transmission unit 250 receives the acknowledgement of receipt transmitted by the receipt acknowledgement generation unit 240, and transmits the acknowledgement of receipt to the transmitting device 1000.

An exemplary embodiment of the present invention can be realized as computer-readable code written on a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission through the Internet).

According to the exemplary embodiments of the present invention, in a wireless network environment, a transmitting device can transmit considerable amounts of data by sequentially transmitting a plurality of blocks. The transmitting device does not receive an acknowledgement of receipt whenever an error occurs during the transmission of data but receives an acknowledgement of receipt after the transmission of the data is concluded. Thereafter, the transmitting device only transmits one or more data frames that are determined to be erroneous by referencing the acknowledgement of receipt, thereby reducing the amount of data that needs to be retransmitted and the number of data retransmissions. Therefore, it is possible to enhance overall throughput.

The exemplary embodiments of the present invention have been described above as being applied to an IEEE 802.11-based wireless local area network (WLAN) environment, but application of the present invention is not restricted to this. In other words, the present invention can be applied to a heterogeneous network environment such as Power Line Control (PLC).

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of transmitting data comprising:
    transmitting a first block comprising a plurality of data frames to a terminal;
    transmitting to the terminal an acknowledgement request comprising serial numbers of the plurality of transmitted data frames arranged in an order in which the plurality of transmitted data frames are transmitted;
    receiving an acknowledgement of receipt of the first block from the terminal based on the acknowledgement request; and
    transmitting to the terminal a second block comprising at least one frame of the plurality of data frames of the first block if the acknowledgement of receipt indicates that at least one data frame of the plurality of data frames of the first block has not been properly received by the terminal,
    wherein the acknowledgement of receipt comprises a bitmap including bits arranged corresponding to an order in which the plurality of data frames of the first block are transmitted.

2. The method of claim 1, wherein the transmitting of the first block comprises sequentially transmitting the first block and an additional plurality of blocks, each of the first block and the additional plurality of blocks comprising a plurality of data frames, and the receiving comprises receiving an acknowledgement receipt of the first block and the additional plurality of blocks.

3. The method of claim 1, wherein the bitmap indicates whether each of the plurality of data frames has been properly received by the terminal,
    wherein the receiving the acknowledgement of receipt further comprises determining whether each of the data frames has been properly received by the terminal according to the bitmap.

4. The method of claim 1 further comprising, after the transmitting of the second block, receiving from the terminal another acknowledgement of receipt indicating that all data frames of the at least one data frame of the second block have been transmitted to the terminal.

5. The method of claim 1, wherein the acknowledgement request comprises a media access control (MAC) header comprising information regarding the acknowledgement request according to the IEEE 802.11e standard.

6. A computer-readable recording medium storing a computer program for executing a method comprising:
    transmitting a first block comprising a plurality of data frames to a terminal;
    transmitting to the terminal an acknowledgement request comprising serial numbers of the plurality of transmitted data frames arranged in an order in which the plurality of transmitted data frames are transmitted;
    receiving an acknowledgement of receipt of the first block from the terminal based on the acknowledgement request; and
    transmitting to the terminal a second block comprising at least one frame of the plurality of frames of the first block if the acknowledgement of receipt indicates that at least one data frame of the plurality of data frames of the first block has not been properly received by the terminal,
    wherein the acknowledgement of receipt comprises a bitmap including bits arranged corresponding to an order in which the plurality of data frames of the first block are transmitted.

7. A method of receiving data comprising:
    receiving from a terminal a first block comprising a plurality of data frames;
    received from a terminal an acknowledgement request comprising serial numbers of the plurality of data frames arranged in an order in which the plurality of data frames were transmitted from the terminal;
    transmitting an acknowledgement of receipt indicating whether each data frame of the plurality of data frames of the first block has not been properly received by the terminal based on the acknowledgement request; and
    receiving a second block comprising at least one data frame of the plurality of data frames of the first block if the at least one data frame has not been properly received from the terminal,
    wherein the acknowledgement of receipt comprises a bitmap including bits arranged corresponding to an order in which the plurality of data frames of the first block are received.

8. The method of claim 7, wherein the receiving of the first block comprises sequentially receiving the first block and an additional plurality of blocks, each of the first block and the additional plurality of blocks comprising a plurality of data frames, and the transmitting comprises transmitting an acknowledgement receipt of the first block and the additional plurality of blocks.

9. The method of claim 7, wherein the bitmap indicates whether each of the data frames has been properly received,
    wherein the receiving of the second block comprises determining whether each of the plurality of data frames has been properly received according to the bitmap.

10. The method of claim 7 further comprising, after the receiving of the second block, transmitting another acknowledgement of receipt indicating that all data frames of the at least one data frame of the second block have been transmitted to the terminal.

11. The method of claim 7, wherein the acknowledgement request comprises a media access control (MAC) header that comprises a frame type field storing information regarding the acknowledgement request according to the IEEE 802.11e standard.

12. A computer-readable recording medium storing a computer program for executing a method comprising:
 receiving from a terminal a first block comprising a plurality of data frames;
 received from a terminal an acknowledgement request comprising serial numbers of the plurality of data frames arranged in an order in which the plurality of data frames were transmitted from the terminal;
 transmitting an acknowledgement of receipt indicating whether each data frame of the plurality of data frames has not been properly received by the terminal based on the acknowledgement request; and
 receiving a second block comprising at least one data frame of the plurality of data frames of the first block if the at least one data frame has not been properly received from the terminal.

13. A block transmission apparatus comprising:
 a transmission unit which transmits a first block comprising a plurality of data frames to a terminal, and transmits to the terminal an acknowledgement request comprising serial numbers of the plurality of transmitted data frames arranged in an order in which the plurality of transmitted data frames are transmitted; and
 a reception unit which receives an acknowledgement of receipt of the first block from the terminal based on the acknowledgement request,
 wherein the transmission unit references the acknowledgement of receipt and transmits a second block comprising at least one data frame of the plurality of data frames of the first block if the at least one data frame has not been properly received by the terminal, and
 wherein the acknowledgement of receipt comprises a bitmap including bits arranged corresponding to an order in which the plurality of data frames of the first block are transmitted.

14. A block reception apparatus comprising:
 a reception unit which receives a first block comprising a plurality of data frames from a terminal, and receives from the terminal an acknowledgement request comprising serial numbers of the plurality of data frames in an order in which the plurality of data frames were transmitted from the terminal; and
 a transmission unit which transmits to the terminal an acknowledgement of receipt indicating if at least one data frame of the plurality of data frames of the first block has not been properly received based on the acknowledgement request,
 wherein the transmission unit receives a second block comprising the at least one data frame of the plurality of data frames of the first block if the at least one data frame has not been properly received from the terminal, and p1 wherein the acknowledgement of receipt comprises a bitmap including bits arranged corresponding to an order in which the plurality of data frames of the first block are received.

* * * * *